US005793327A

United States Patent [19]
Carnes et al.

[11] Patent Number: 5,793,327
[45] Date of Patent: Aug. 11, 1998

[54] CW RADAR RANGE MEASURING SYSTEM

[75] Inventors: L Shaun Carnes, deceased, late of Chelmsford, by Diane C. Carnes, executrix; Dean L. Shollenberger, Townsend, both of Mass.

[73] Assignee: Raytheon Company, Lexington, Mass.

[21] Appl. No.: 769,110

[22] Filed: Dec. 18, 1996

[51] Int. Cl.$^6$ .................................... G01S 13/28
[52] U.S. Cl. .................. 342/135; 342/145; 342/192; 342/196
[58] Field of Search .................... 342/85, 135, 145, 342/192, 195, 196, 21

[56] References Cited

U.S. PATENT DOCUMENTS

| | | | |
|---|---|---|---|
| 4,618,863 | 10/1986 | Collins | 342/194 |
| 4,620,192 | 10/1986 | Collins | 342/128 |
| 5,293,168 | 3/1994 | Faulkner | 342/145 |

Primary Examiner—John B. Sotomayor
Attorney, Agent, or Firm—Fish & Richardson P.C.

[57] ABSTRACT

A CW radar range measuring system having a transmitter adapted to transmit a continuous wave radar signal phase encoded in accordance with a code and a receiver adapted to receive a radar return from the transmitted radar signal. The receiver includes an analog to digital converter section for converting a sequence of samples of the radar return into a corresponding sequence of digital words. A digital correlator/integrator is fed by the digital words and the code for providing an indication of radar return energy as a function of range from the transmitter. A processor is fed by the digital correlator/integrator for determining, from the indicated energy, target range. The system includes a frequency spectrum analyzer for determining a frequency spectrum of the digital words and wherein the processor determines the target Doppler frequency from such determined frequency spectrum. In one embodiment of the invention, the digital correlator/integrator is fed the digital words and the frequency analyzer is coupled between the digital correlator/integrator and the processor. In another embodiment of the invention the frequency analyzer is fed the digital words and the digital correlator/integrator is coupled between the frequency analyzer and the processor.

14 Claims, 5 Drawing Sheets

TARGET ONLY

CLUTTER ONLY

TARGET PLUS CLUTTER

TARGET PLUS CLUTTER PLUS (TARGET PLUS CLUTTER "RESIDUE" INVERTED)

CW RADAR RANGE MEASURING SYSTEM

This invention was made with Government support under Department of the Army Contract No. DAAH01-91-C-0625 awarded by the United States Army.

CROSS REFERENCE TO RELATED APPLICATIONS

This application relates to copending patent application Ser. No. 08/745,530 filed Nov. 12, 1996, Anthony Curran, Steven Potts, Arthur Crain as inventors, assigned to the same assignee as the present invention, the contents thereof being incorporated herein by reference.

BACKGROUND OF THE INVENTION

This invention relates generally to continuous wave (CW) radar range measuring systems and more particularly to systems of such type wherein a transmitted CW signal is modulated in accordance with a known code and target radar returns are correlated with differently time delayed replica of the code to determine target range.

As is known in the art, CW radars have been used to accurately, and unambiguously measure the velocity of a target by detecting a Doppler frequency shift in radar returns from the target. In order to enable such CW radar system to determine the range to the target, the transmitted carrier signal frequency, or phase is modulated in some known fashion to determine target range. This technique is described on pages 86 through 111 of a book entitled "Introduction to Radar Systems" by Merrill I. Skolnik, published 1962 by McGraw-Hill Book Company, Inc.

One typical application for such CW radar range measuring system is in missile fuzing systems. In one such fuzing system, the phase of the transmitted CW signal is changed by 180 degrees, or not changed, selectively in accordance with a binary, pseudo-random noise code. Thus, a code of for example, N bits, is stored in a recirculating shift register memory. The bits are read out at a predetermined rate, $f_s$, and fed to a bi-phase modulator along with the CW signal. The phase of the CW signal changes 180 degrees in response to a logic 1 bit and remains unchanged in response to a logic 0 bit, for example. The coded CW signal is transmitted through a transmit antenna. Radar returns from a target are received by a receive antenna. The received CW returns will have the same code as the transmitted code; however, the received code pattern will be time delayed with respect to the transmitted code an amount related to the target's range. Target radar returns are correlated with differently time delayed replica of the code to determine target range. Such technique is described on pages 10.19–10.25 in "Radar Handbook-Second Edition", edited by Merrill I. Skolnik, published by McGraw-Hill Publishing Company, 1990. Further, the frequency of the returns will be shifted by the targets' velocity (i.e., Doppler frequency of the target).

One system used to determine the target's range separates the received signals into a plurality of channels. The signal in each channel is fed to a correlator where the signal is multiplied with the code (albeit that the code fed to each channel has a different predetermined time delay relative to the transmitted code) and integrated. Thus, each channel corresponds to a range channel. In the absence of noise and/or clutter, the one of the channels having the greatest received power indicates the range to the target. (That is, the received code will "correlate" with the transmitted code in the range channel corresponding to the target's range.) Further, the frequency component in the frequency spectrum for such range channel having the greatest power indicates the target Doppler velocity (i.e., Doppler frequency, $f_D$).

While such system may provide adequate target range measurement accuracy in some application, amplitude and phase mismatches among the channels may adversely effect such system's performance in other applications.

As is also known in the art, with such system, the bits of the code is transmitted at a bit rate, $f_s$, and therefore the target range is resolved to a range resolution cell of $1/f_s$. While such range resolution may be adequate in some applications, in other applications greater range cell resolutions or accuracies are required.

SUMMARY OF THE INVENTION

In accordance with the present invention, a continuous wave (CW) radar range measuring system is provided. The system includes a transmitter adapted to transmit a continuous wave radar signal phase encoded in accordance with a code; and, a receiver adapted to receive a target reflected radar return from the transmitted radar signal. The receiver includes an analog to digital converter section for converting a sequence of samples of the radar return into a corresponding sequence of digital words. A digital correlator/integrator is fed by the digital words and the code for providing an indication of radar return energy as a function of range from the transmitter. A processor is fed by the digital correlator/integrator for determining, from the indicated energy, target range. The system includes a frequency spectrum analyzer for determining a frequency spectrum of the radar return from the digital words. The processor determines the target Doppler frequency from such determined frequency spectrum.

In one embodiment of the invention, the digital correlator/integrator is fed the digital words and the frequency analyzer is coupled between the digital correlator/integrator and the processor.

In another embodiment of the invention the frequency analyzer is fed the digital words and the digital correlator/integrator is coupled between the frequency analyzer and the processor.

BRIEF DESCRIPTION OF THE DRAWING

Other embodiments of the invention, as well as the invention itself, will become more readily apparent with reference to the following detailed description taken together with the following drawings, in which:

FIGS. 4A and 4B are TABLES useful in understanding the operation of a time multiplexor used in the system of FIG. 3, FIG. 4A showing data at input ports of the time multiplexor as a function of time and FIG. 4B showing data at an output port of such time multiplexor as a function of time;

FIG. 5 is a TABLE useful in understanding the operation of multipliers used in an correlation/integration section of the system of FIG. 3.

DESCRIPTION OF THE PREFERRED EMBODIMENTS

Figure 1:
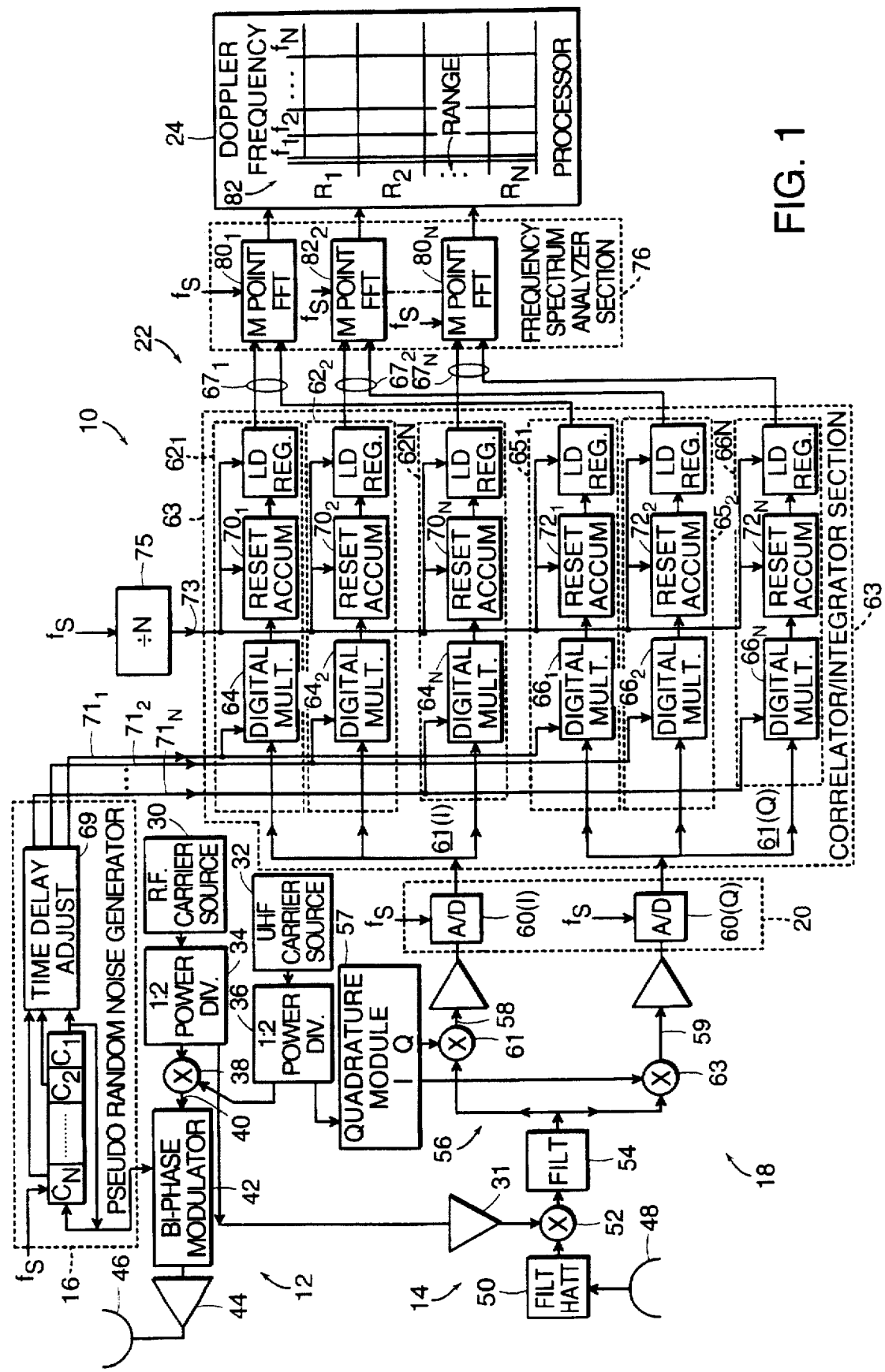
FIG. 1 is a block diagram of a CW radar range measuring system according to the invention; and, FIGS. 2A–2D show correlation function as a function of range for the system of FIG. 1, FIG. 2A showing such function in the case of a radar return from an ideal target and without any accompanying clutter, FIG. 2B showing such function in the case of a radar return from a clutter and without any target return, FIG. 2C showing such function in the case of a radar return from a target return and with accompanying clutter, and FIG. 2D showing such function in the case of a radar return from a target return and with accompanying clutter after correcting for determined clutter residual effects on the correlation process.

Referring now to FIG. 1, a CW radar range measuring system 10 is shown to include a transmitter 12 and a receiver 14. The transmitter 12 is adapted to transmit a continuous wave radar signal phase encoded at a rate, $f_s$, in accordance with a code. The code is here a sequentially repeating N-bit binary, pseudo-random noise code stored in a recirculating shift register 16, as shown.

The receiver 14 is adapted to receive a target reflected radar return from the transmitted radar signal and includes: (a) a heterodyning section 18 for translating the radar returns to a baseband frequency; (b) an analog to digital converter section 20 for converting samples of the radar return into a series of corresponding digital words at the rate, $f_s$; (c) a digital correlator/integrator and frequency spectrum analyzer section 22 fed by the series of digital words and the differently time delayed replica of the successively repeating N-bit binary code for producing an output representative of energy in the radar return as function of range from the transmitter 12 for each of a plurality of frequencies; and (d) a processor 24 fed by the output of the digital correlator/integrator and frequency spectrum analyzer section 22 for indicating target range and Doppler frequency.

Thus, referring in more detail to FIG. 1, a radio frequency (RF) carrier source 30 producing a signal having a frequency, $f_{RF}$, and an ultra-high frequency (UHF) reference source 32 producing a signal having a frequency, $f_{URF}$, are fed via 2:1 power dividers 34, 36, respectively, to mixer 38 to thereby produce a CW signal on line 40 having a carrier frequency $f_{RF}+f_{UHF}$. The CW signal on line 40 is then bi-phase modulated in bi-phase modulator 42 with the pseudo-random noise code stored in the recirculating shift register 16. The bi-phase modulated signal is amplified in amplifier 44 and transmitted via transmit antenna 46. Radar returns are fed via receive antenna 48 and filter/limiter-amplifier 50 to the heterodyning section 18. More particularly, the signal produced at the output of filter/limiter-amplifier 50 is fed to a mixer 52 along with an amplified portion of the RF carrier produced by source 30 after passing through amplifier 31, as indicated. The output of mixer 52 is fed to an anti-aliasing filter 54, here a single, Gaussian bandpass Surface Acoustic Wave (SAW) filter. The output of the anti-aliasing filter 54 is fed to quadrature mixer section 56 along with in-phase and quadrature components of the UHF carrier source 32 produced signal produced by quadrature modulator 57, thereby providing in-phase (I) and quadrature (Q) signals on lines 58, 59, respectively, as shown.

The in-phase and quadrature signals on line 58, 59 are fed to an analog to digital converter section 20, as shown. Thus, the in-phase signal on line 58 is fed to analog to digital converter (A/D) 60(I) and the quadrature signal is fed to A/D converter 60(Q). The A/D converters 60(I), 60(Q) convert samples of the baseband signals fed thereto on lines 58, 59, respectively, into corresponding digital words at the rate, $f_s$. It is here noted that the anti-aliasing function of filter 54 is required in a sampled data system as the sampling function (like a sub-harmonic mixer) makes frequencies at multiples of the sample rate, $f_s$, ambiguous. Furthermore, frequencies above one-half the sample frequency, $f_s$, are ambiguous by the Nyquist criteria. Therefore, the anti-alias filter 54 rejects signal content above one-half the sample frequency (i.e., the frequency, $f_s/2$) sufficiently to result in unambiguous resolution of the desired target Doppler frequency band signal content at the correlator/integrator and frequency spectrum analyzer section 22. The filter 54 is realized in SAW technology at UHF to avoid a requirement to implement two video low-pass filters, one in each of the I and Q mixer 61, 63 outputs, whose gain and phase mismatches would contribute to time sidelobes in the correlation function. In addition, the SAW filter 54 is smaller than its discrete component, video counterpart and provides more easily repeatable, controlled performance. The filter parameters, especially the impulse response, are chosen to provide a close match to the Gaussian filter, because the filter function modifies the realized auto-correlation function—essentially smearing the auto-correlation function according to the rise and decay of the impulse response. Therefore, it is very undesirable to have an impulse response which has slow or un-symmetric rise and fall times, or have ripple (decaying oscillation). The Gaussian filter 54 is chosen because of its quick decay and nearly symmetric impulse response, which maintains the symmetry of the auto-correlation response of the system 10, and minimizes the smearing of the response so that acceptable sidelobe levels and out-of-range rejection are achieved at ranges two range channels or more beyond the range channel of interest. Here, as will be described in connection with FIGS. 2A though 2D, here one out-of-range rejection channel is used, i.e., the maximum expected target range channel corresponding to a maximum expected target range $R_{MAX}$.

The A/D converters 60(I), 60(Q) in the in-phase and quadrature channels 61(I), 61(Q), respectively, sample synchronously at the bit rate, $f_s$, of the pseudo-random noise code sequence in order to correlate the received signal digitally. More particularly, a correlator/integrator section 63 is provided having a plurality of, here N, correlator/integrator $62_1$–$62_N$ for the in-phase channel 61(I) and a plurality of, here N, correlator/integrator $66_1$–$66_N$ for the quadrature channel 61(Q). Each one of the correlator/integrators $62_1$–$62_N$ in the in-phase channel 61(I) and each one of the correlator/integrators $66_1$–$66_N$ in the quadrature channel 61(Q) are fed by A/D converters 60(I), 60(Q), respectively, and a different time delayed replica of the N-bit binary code on line $71_1$–$71_N$, respectively. Each time delay corresponds to a different range channel from the transmitter 12 thus providing, for the in-phase channel 61(I) and the quadrature channel 61(Q), a plurality of, here N, range channels $67_1$–$67_N$. Each range channel output producing an output representative of the amount of energy in the radar returns having encoded with the transmitted code.

More particularly, with N-stage recirculating shift resister 16 storing in each one of the N stages $C_1$–$C_N$ thereof a corresponding one of the N-bit binary code, it follows that each one of the N stages $C_1$–$C_N$ will produce at its output a replica of the code; the nth stage, $C_n$, producing its output replica delayed in time by $1/f_s$ from the preceding (n−1)th stage, $C_{n-1}$, where n is an integer 2 through N+1. The differently time delayed replica codes produced at stages $C_1$–$C_N$ of the recirculating shift register 18 are fed, via a delay adjustment circuit 69 to in-phase and quadrature channel multiplier pairs $64_1$, $66_1$ through $64_N$, $66_N$, respectively, as shown, on lines $70_1$ through $70_N$, respectively. A time delay adjustment circuit 69 introduces a fixed time delay to each of the time delated code replica passing thereto from the outputs of stages $C_1$-$C_N$ to account for any signal delays in the receiver 14 prior to the multipliers. Thus, the binary code on line $71_n$ is delayed in time $1/f_s$ from the binary code on line $71_{n-1}$, where, as noted above, n is an integer from 2 through N+1. It follows then that the digital words (i.e, the phase code in target returns) are multiplied by (i.e., correlated with) differently time delayed replica of the transmitted code.

Thus, as noted above, each A/D converter 60(I) output is then digitally passed to digital multipliers $64_1$–$64_N$; the digital multipliers $64_1$–$64_N$ being disposed in range channels $67_1$–$67_N$, respectively, of the in-phase channel 61(I). Likewise, for the quaradrature signals in quadrature channel 61(Q), each A/D converter 60(Q) output is digitally passed to digital multipliers $66_1$–$66_N$; digital multipliers $66_1$–$66_N$ being disposed in range channels $71_1$–$71_N$, respectively. Here, there are N range channels, i.e., one for each of the N bits of the pseudo-random noise code. However, fewer than N range channels may be required. The multiplication of the A/D converters 60(I), 60(Q) sample (i.e., digital word) sequence by the reference pseudo-random code in each channel is simply a process of "multiplying" the sign bit of each digital word produced by the A/D converters 60(I), 60(Q) by the appropriate pseudo-random noise code sequence of binary 1 (for a plus one bit) or 0 (for a −1 bit). Here, the multiplication is realized by passing the sign bit of the A/D converter 60(I), 60(Q) produced digital words and code on lines $71_1$–$71_N$ produced by the recirculating shift register memory 16 through an exclusive-OR gate. That is, each digital multiplier $64_1$–$64_N$, $66_1$–$66_N$ is here an exclusive-OR gate and the TABLE below illustrates the equivalence of this process to analog multiplication:

TABLE

| A/D digital word sign (i.e., polarity) | Pseudo-noise code bit | Exclusive-Or gate (Digital Multiplier Output) | Analog Equivalent |
| --- | --- | --- | --- |
| 0(zero phase shift) | 0(zero phase shift) | logic 0 | +1 |
| 0(zero phase shift) | 1(180 degree phase shift) | logic 1 | −1 |
| 1(180 degree phase shift) | 0(zero phase shift) | logic 1 | −1 |
| 1(180 degree phase shift) | 1(180 degree phase shift) | logic 0 | +1 |

The output of each pair of in-phase and quadrature multiplier $64_1$, $66_1$ through $64_N$, $66_N$ is fed to a corresponding pair of digital low-pass filters $70_1$, $72_1$ through $70_N$, $72_N$, respectively, as shown. Here, each of the digital filters $70_1$, $72_1$, through $70_N$, $72_N$ includes an accumulator (ACCUM) and register (REG). The accumulators (ACCUM) are reset after the N-bit binary code has recirculated through the recirculating shift register 16. Thus, the accumulators (ACCUM) are all are reset after $Nf_s$. Further, just prior to being reset, the accumulator (ACCUM) contents are stored, or loaded (LD), in the register (REG). The reset and load (LD) signals are produced on line 73 by feeding the shift register 16 clock signal of frequency $f_s$, through divide by N frequency divider 75. Thus, pulses are produced on line 73 at a rate, $f_s/N$. The filters $70_1$, $72_1$ through $70_N$, $72_N$ perform the initial coherent integration and lower the data bandwidth input to a frequency spectrum analyzer section 76 here having a plurality of M point, here M is 128, Fast Fourier Transformers (FFTs) $80_1$–$80_N$, one for each one of the here, N, range channels $67_1$–$67_N$. This step is taken to reduce the FFT size required to achieve the final desired target Doppler frequency resolution. (The FFT processing time is directly proportional to the number of additions and multiples required, and the maximum clock rate is limited. Therefore, if continuous processing is to be achieved, the FFT must be performed within the time required to take the number of signal samples required to perform the FFT—otherwise, the amount of FFT hardware must be proliferated, or time gaps in target observation occur. In fact, it is desired to process all range channel FFTs in a single FFT application specific integrated circuit (ASIC).) FFTs are performed for each range channel $67_1$–$67_N$.

Figure 2A:
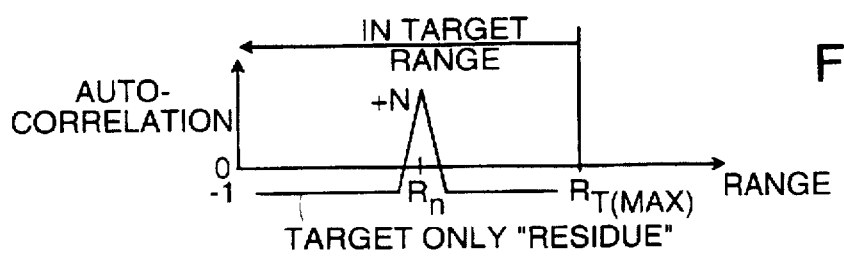
Figure 2B:
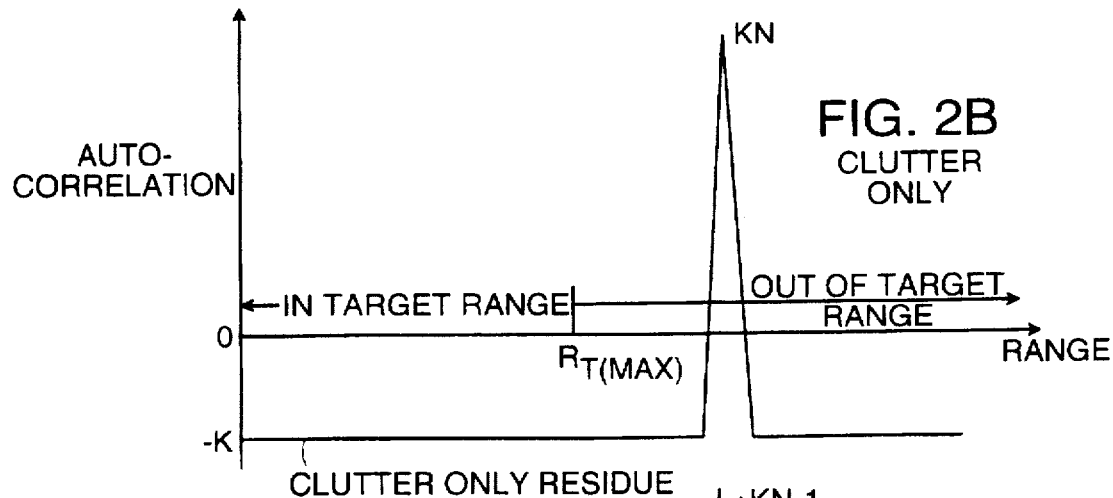
Figure 2C:
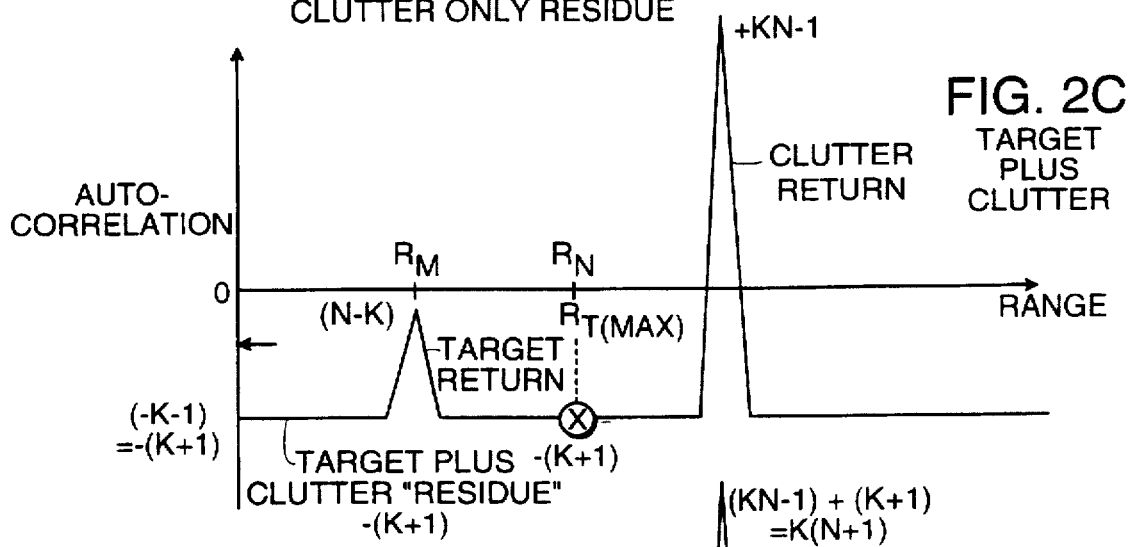
Figure 2D:
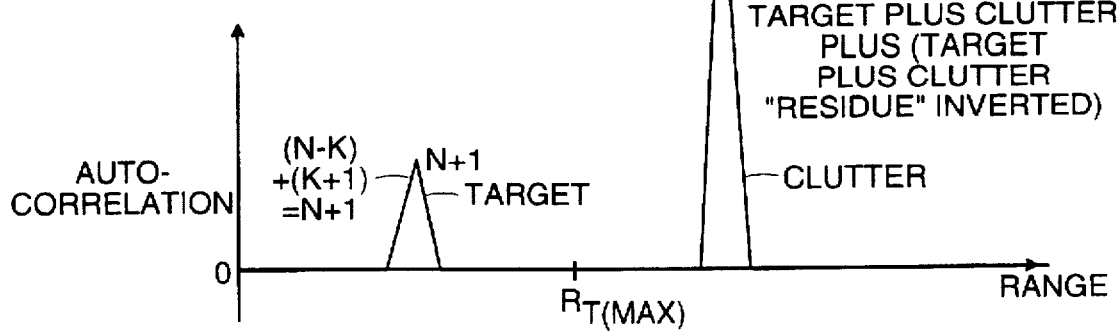

The output of the correlator/integrator section 63 thus provides an auto-correlation between the target radar return and each of a different time delayed replica of the pseudo-random code stored in recirculating shift register 16. Thus, the target radar return has been correlated for each of N ranges from the transmitter 12. If the radar return were only for a target at range $R_n$ (i.e., a radar return having no clutter or noise), the resultant auto-correlation would appear as shown in FIG. 2A. It is noted that range channel $67_n$ would have a peak at +N and all other range channels $67_1$–$67_{n-1}$, $67_{n+1}$–$67_N$ would have an auto-correlation residue of −1. It is also noted that the maximum range expected for a target is at a range $R_{MAX}$, which is a range less that corresponding to the greatest range channel $67_N$. If, on the other hand, no target is within the expected range ($R_1$–$R_{N-1}$<$R_{MAX}$=$R_N$) but there is clutter, or noise, in ranges outside of the expected target range (i.e., ranges >$R_{MAX}$), the out-of-range channels, here channel $67_N$, will produce auto-correlation function such as that shown in FIG. 2B. That is, the peak auto-correlation function will be KN and will have a residue −K, as shown, where K is the ratio of the clutter radar return voltage to the target radar return voltage and may be a complex number. In a more realistic condition, the radar return will include both target return and clutter return, as shown in FIG. 2C. It is noted in FIG. 2C that the clutter return greatly suppresses the target auto-correlation function peak (now (N−K)) at range $R_n$. It is also noted that the auto-correlation residue will be (−K−1)=−(K+1) at a range outside the expected target range, here at the maximum target expected range, $R_{MAX}$, i.e., here a range corresponding to range channel $67_N$. Thus, here the Nth range channel, $67_N$, $R_{MAX}$=$R_N$, is used to provide a measure of the residue (−K−1). As will be described this Out-Of-Range residue (−K−1) will be subtracted from the auto-correlation functions produced in range channels $67_1$–$67_{N-1}$ thereby resulting in the auto-correlation function shown in FIG. 2D. In FIG. 2D it is noted that within the expected range of the target, i.e., at ranges less than $R_{MAX}$, the peak target auto-correlation function will be (N−K)+(K+1)=N+1, as indicated, and therefore at a level more readily detectable than that shown in FIG. 2C.

Referring again to FIG. 1, the output of the correlator/integrator section 63 is fed to the frequency spectrum analyzer section 76. The frequency spectrum analyzer section 76 includes, as noted above, a plurality of, here N, frequency spectrum analyzers, here FFTs $80_1$–$80_N$. Each one of the FFTs $80_1$–$80_N$ is fed by a corresponding pair of the correlator/integrator $62_1$, $66_1$, through $62_N$, $66_N$ in the in-phase and quadrature channels 61(I), 61(Q), respectively, to determine the frequency spectrum of the radar return in a corresponding one of the plurality of range channels $67_1$–$67_N$, respectively.

More particularly, the outputs of each in-phase and quadrature phase filter pair $70_1$, $72_1$, through $70_N$, $72_N$ are fed to a corresponding one of N, M-point FFT $80_1$–$80_N$, respectively, as shown. Thus, as noted above, the frequency spectrum section 76 includes a plurality of FFTs $80_1$–$80_N$; one for each range channel $67_1$–$67_N$. Further, as noted above, the pair of filters $70_1$, $72_1$, through $70_N$, $72_N$ are fed to a corresponding one of the FFTs $80_1$–$80_N$, respectively, as shown. Here, as also noted above, each FFT $80_1$–$80_N$ is an M point FFT, where here M is 128. Thus, each one of the FFTs $80_1$–$80_N$ produces a frequency spectrum of the radar return at a corresponding one of the N range channels $67_1$–$67_N$ (i.e., ranges $R_1$–$R_N$, respectively). The M frequency components, $f_1$–$f_M$, are serially produced by each one of the N FFTs $80_1$–$80_N$ at the bit rate $f_r$, and are stored in a memory 82 in processor 24 as a Range-Doppler frequency map, or matrix, as shown. The processor 24 analyzes the range-Doppler matrix to determine target range and Doppler frequency. For example, in the absence of clutter or received noise, the frequency component having the maximum energy level, here theoretically N, indicates that the target has such frequency component as its Doppler frequency and the range channel with such frequency component indicates the range to the target, as described above in connection with FIG. 2A. In order to enhance the signal from the target in the presence of noise or clutter (FIG. 2C), clutter suppression techniques, such as those described in the above and in the above referenced patent application may be used. In such case, an additional range channel, i.e., a so-called "image", or out-of-range, channel, here range channel $67_N$) is provided and the frequency components produced in the FFT $80_N$ used in such range channel $67_N$ are subtracted from corresponding frequency components produced by each of the FFTs $80_1$–$80_N$. That is, the clutter cancellation is implemented digitally at each of the FFT $80_1$–$80_N$ output by coherently subtracting an "image" range channel FFT $80_N$ from each range channel FFT $80_1$–$80_{N-1}$ output on a frequency component by frequency component, for those frequency components which cover the target Doppler frequency uncertainty. That is the Range-Doppler frequency map in memory 82 will be modified by the frequency spectrum in range $R_N=R_{MAX}$ so that, for example, the energy at the frequency component $f_1$ at range $R_1$ will have subtracted from it the auto-correlation function residue energy (K+1) at the corresponding frequency component $f_1$ at range $R_N$, as described above in connection with FIG. 2D. In like manner, the energy at the frequency component $f_1$ for each of the range $R_2$–$R_{N-1}$ will have subtracted from it, the energy at the corresponding frequency component $f_1$ at range $R_N$. Thus, in the general case, for the mth frequency component at range $R_n$, i.e., $f_{m,Rn}$, the FFT $80_n$ will have subtracted from the frequency component $f_m$ produced by it the mth frequency component produced by FFT $80_N$, i.e., $f_{m,RN}$. That is the processor 24 will have stored in Range-Doppler frequency cell $f'_{m,RN}$, $f_{m,Rn}$—$f_{m,RN}$, where m=1 to M and n=1 to (N−1). The process is performed for each Doppler frequency component; however, it is unnecessary to perform this clutter cancellation on Doppler frequencies outside the expected target Doppler frequency band. The resultant range channel FFTs $80_1$–$80_{N-1}$ as well as the Nth range channel FFT $80_N$ are passed to the processor 24 where constant false alarm rate (CFAR), target detection, electromagnetic counter-measure (ECM) and clutter avoidance algorithms may be performed.

Figure 3:
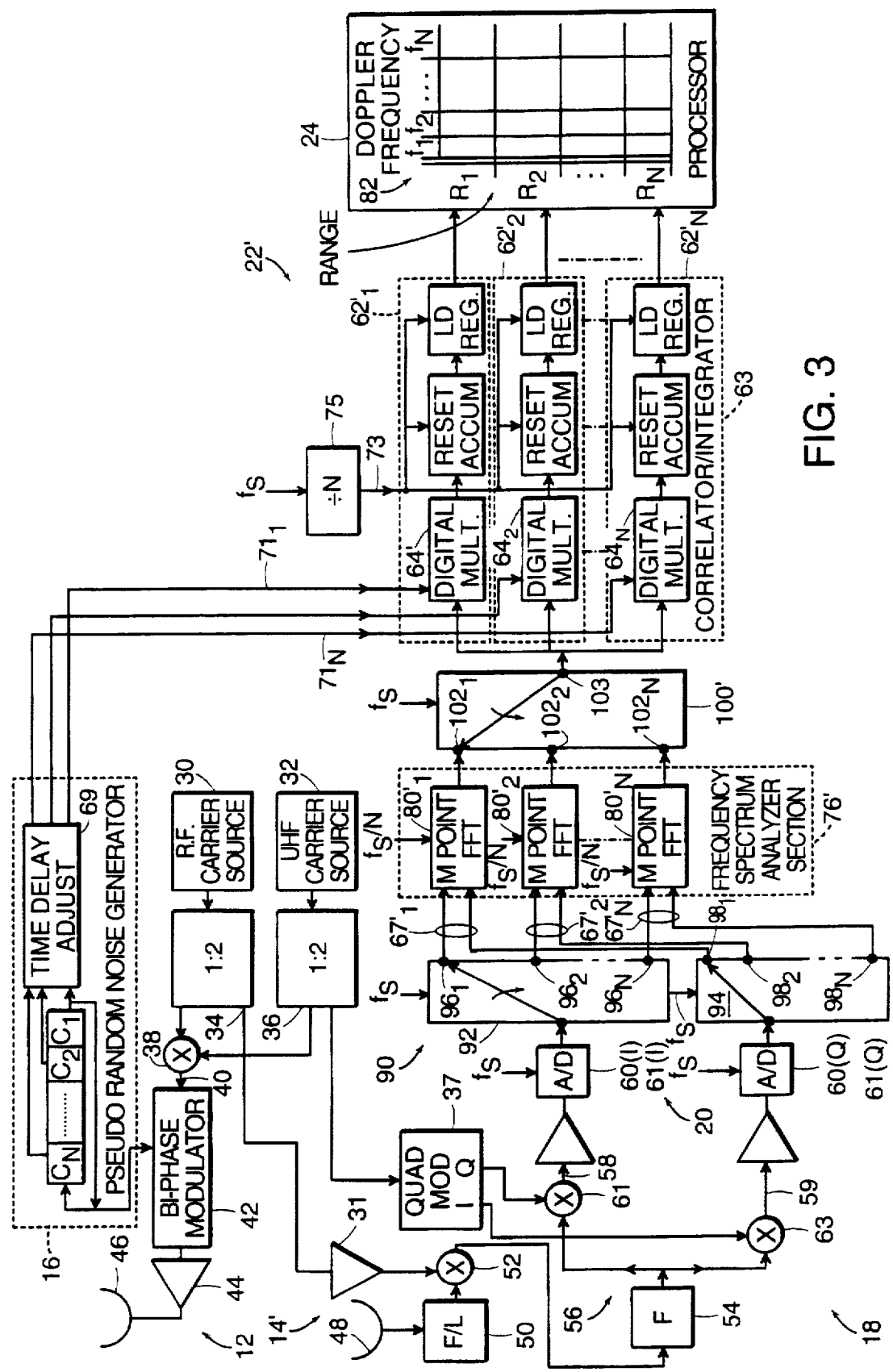
FIG. 3 is a block diagram of a CW radar range measuring system according to another embodiment of the invention.

Referring now to FIG. 3, a CW radar range measuring system 10' is shown, like elements to those in the system 10 shown in FIG. 1 having like numerical designation. Thus, the system 10' in FIG. 3 includes the transmitter 12 and a receiver 14'. The transmitter 12 is, as noted above in connection with FIG. 1, adapted to transmit a continuous wave radar signal phase encoded at a rate, $f_r$, in accordance with a code. The code is here a sequentially repeating N-bit binary, pseudo-random noise code stored in a recirculating shift register 16, as shown.

The receiver 14', like receiver 14 in FIG. 1, is adapted to receive a target reflected radar return from the transmitted radar signal and includes: (a) a heterodyning section 18 for translating the radar returns to a baseband frequency; and, (b) an analog to digital converter section 20 for converting samples of the radar return into a series of corresponding digital words at the rate, $f_r$; (c) a digital correlator/integrator and frequency spectrum analyzer section 22' fed by the series of digital words and the differently time delayed replica of the successively repeating N-bit binary code for producing an output representative of energy in the radar return as function of range from the transmitter 12 for each of a plurality of frequencies; and (d) a processor 24 fed by the output of the digital correlator/integrator and frequency spectrum analyzer section 22' for indicating target range and Doppler frequency. Here, however, instead of the digital correlator/integrator section 63' being fed by the digital words produced by A/D converter section 20 and the frequency analyzer section 76' being coupled between the digital correlator/integrator section 63 and the processor 24, as in the system 10 of FIG. 1, here in system 10', the frequency analyzer section 76' is fed by the digital words produced by A/D converter section 20 and the digital correlator/integrator section 63' is coupled between the frequency analyzer section 76' and the processor 24.

Thus, referring in more detail to FIG. 3, the radio frequency (RF) carrier source 30 produces a signal having a frequency, $f_{RF}$, and the ultra-high frequency (UHF) reference source 32 producing a signal having a frequency, $f_{UHF}$, are fed via 2:1 power dividers 34, 36, respectively, to mixer 38 to thereby produce a CW signal on line 40 having a carrier frequency $f_{RF}+f_{UHF}$. The CW signal on line 40 is then bi-phase modulated in bi-phase modulator 42 with the pseudo-random noise code stored in the recirculating shift register 16. The bi-phase modulated signal is amplified in amplifier 44 and transmitted via transmit antenna 46. Radar returns are fed via receive antenna 48 and filter/limiter-amplifier 50 to the heterodyning section 18. The output of mixer 52 is fed to the anti-aliasing filter 54, here a single, Gaussian bandpass Surface Acoustic Wave (SAW) filter. The output of the anti-aliasing filter 54 is fed to quadrature mixer section 56 along with in-phase and quadrature components of the UHF carrier source 32 produced signal produced by quadrature modulator 57, thereby providing in-phase (I) and quadrature (Q) signals on lines 58, 59, respectively, as shown.

The in-phase and quadrature signals on line 58, 59 are fed to an analog to digital converter section 20, as shown. The A/D converters 60(I), 60(Q) convert samples of the baseband signals fed thereto on lines 58, 59, respectively, into corresponding digital words at the rate, $f_r$.

A time multiplexor section 90 is fed by the series of digital words produced by the A/D converter section 20 for, during each of a series of periods, $T=N/f_r$, coupling each nth one of N sequentially converted samples to a corresponding nth one of N channels $67'_1$–$67'_N$ at the rate, $1/f_r$. More particularly, the time multiplexor section 90 includes a time multiplexor 92 in the in-phase channel 61(I) and a time multiplexor 94 in the quadrature channel 61(Q), as shown. Each one of the time multiplexor is fed the digital words produced by a corresponding one of the A/D converters 60(I), 60(Q), respectively, as shown. Each one of the time multiplexors 92, 94 has N output ports, $96_1$–$96_N$, $98_1$–$98_N$, respectively, as shown. The two time multiplexors 90, 92 operate synchronously with each other and are fed with the same bit rate signal, $f_s$, as indicated. Thus, as N digital words, $S_1$—$S_N$, produced by A/D converter 60(I) are sequentially fed to the input of time multiplexor 92, they appear at output ports $96_1$–$96_N$ sequentially (i.e., the digital words $S_1$–$S_N$ appear at output ports $96_1$–$96_N$, respectively, at the rate, $f_s$. As the next N digital words produced by A/D converter 60(I) are sequentially fed to the input of time multiplexor 92, they again appear at output ports $96_1$–$96_N$ sequentially (i.e., $S_{N+1}$–$S_{2N}$). Thus, digital words $S_n$, $S_{n+N}$, $S_{n+2N}$, ... $S_{n+(M)N}$, appear sequentially at output port $96_n$ of multiplexor 92, where M is here 128, as noted above, and n is an integer from 1 to 256. More particularly, and considering an exemplary one of the output ports, here output port $96_1$, if the digital words sequentially produced by the A/D converter 92 are $S_1$, $S_2$, ..., the digital words $S_1$, $S_{N+1}$, $S_{2N+1}$, appear sequentially at output port $96_1$. Multiplexor 94 operates in a like manner with the digital words produced by the A/D converter 94 for the quadrature channel 61(Q). It follows then that pairs of output ports $96_1$, $98_1$ through $96_N$–$98_N$, respectively, provide range $67'_1$ through $67'_N$, respectively.

The outputs of the time multiplexors 92, 94 are fed to the frequency spectrum analyzer section 76', as shown. The frequency spectrum analyzer section 76' includes a plurality of, N, frequency spectrum analyzers, here M point FFTs $80'_1$–$80'_N$, where M=128. Each one the analyzers $80_1$–$80_M$ is fed by the digital words coupled to a corresponding one of the N channels $67'_1$–$67'_N$, for determining the frequency spectrum of the signal represented by the digital words fed thereto. A second time multiplexor 100 is provided for, during each of the series of periods, $T=N/f_s$, coupling each nth one of N frequency spectrum analyzers FFTs $80'_1$–$80'_N$ to an output at the rate, $1/f_s$.

More particularly, the pair of output ports $96_1$, $98_1$ through $96_N$–$98_N$, respectively, (i.e., channels $67'_1$ through $67'_N$, respectively) are fed to M point FFTs $80'_1$ through $80'_N$, respectively, as shown. It is noted that the digital words fed to each one of the FFTs $80'_1$–$80'_N$ appear at a rate $f_s$/N. In response to the digital words fed thereto each FFT $80'_1$–$80'_N$ the frequency spectrum is produced. Thus, the FFTs $80'_1$ through $80'_N$ provide the frequency spectra for radar returns in channels $67'_1$ through $67'_N$, respectively. More particularly, and considering an exemplary one of the ports $102_1$–$102_N$, here port $102_1$, the frequency components $f_1$–$f_M$ for the first channel $67'_1$ appear at port $102_1$ (i.e., $f_{1,R1}$, $f_{2R1}$, ... $f_{mR1}$, ... $f_{MRN}$), each one of the frequency components appearing at such port $102_1$ at a rate $f_s$/N. Thus, here the same frequency component $f_s$, where m is an integer from 1 to M, for the N channels $67'_1$ through $67'_N$ appears sequentially at ports $102_1$ through $102_N$ at the bit rate $f_s$, as shown in the table in FIG. 4A, where $f_{n,Rn}$ is the frequency component $f_m$ for the range $R_n$ in the channel $67_n$.

The outputs of FFTs $80'_1$ through $80'_N$ are fed to input ports $102_1$ through $102_N$, respectively, of the second time multiplexor 100, as shown. The time multiplexor 100 operates synchronously with time multiplexors 92, 94 at bit rate $f_s$. The operation of multiplexor 100 is summarized in the FIGS. 4A and 4B, where the frequency component m at channel $67_n$, n, is designated by the $f_{m,Rn}$; the data at ports $102_1$ through $102_N$ as a function of time being shown in FIG. 4A and the data at multiplexor 100 output port 103 as a function of time being shown in FIG. 4B.

A plurality of, here N, correlator/integrators $62'_1$–$62'_N$, is fed, via lines $71_1$–$71_N$ by the second multiplexor 100 output 103 and a different time delayed replica of the N-bit binary code stored in register 16, each time delay corresponding to a different range from the transmitter. More particularly, the output port 103 is fed to one input of the multipliers $64'_1$–$64'_N$, as shown. The other input to the multipliers $64'_1$–$64'_N$ is fed differently time delayed replica of the code stored in register 16 after passing through the time delay adjuster 69. Thus, the codes in stages $C_1$–$C_N$ appear lines $71_1$–$71_N$, respectively. Lines $71_1$–$71_N$, are fed to multipliers $64'_1$–$64'_N$, respectively, as shown. The multiplications performed by multipliers $64'_1$–$64'_N$ are summarized in FIG. 5. Thus, multiplier $64'_1$ multiplies the bits appearing in stage C1 at the bit rate $f_s$ with the frequency component $f_1$ for the channels $67'_1$–$67'_N$, (i.e., ranges $R_1$–$R_N$), respectively, as indicated. These multiplied products are accumulated in the accumulator ACCUM fed by the multiplier $64'_1$ which is initially reset. The accumulated products are loaded (LD) into the register REG fed by the ACCUM. Thus, if the target were at the range $R_1$, and if the target had the Doppler frequency, $f_1$, the contents in the REG would be +N, assuming an absence of clutter. The process repeats for each frequency component $f_2$–$f_M$.

Figures 4A, 4B, 5:
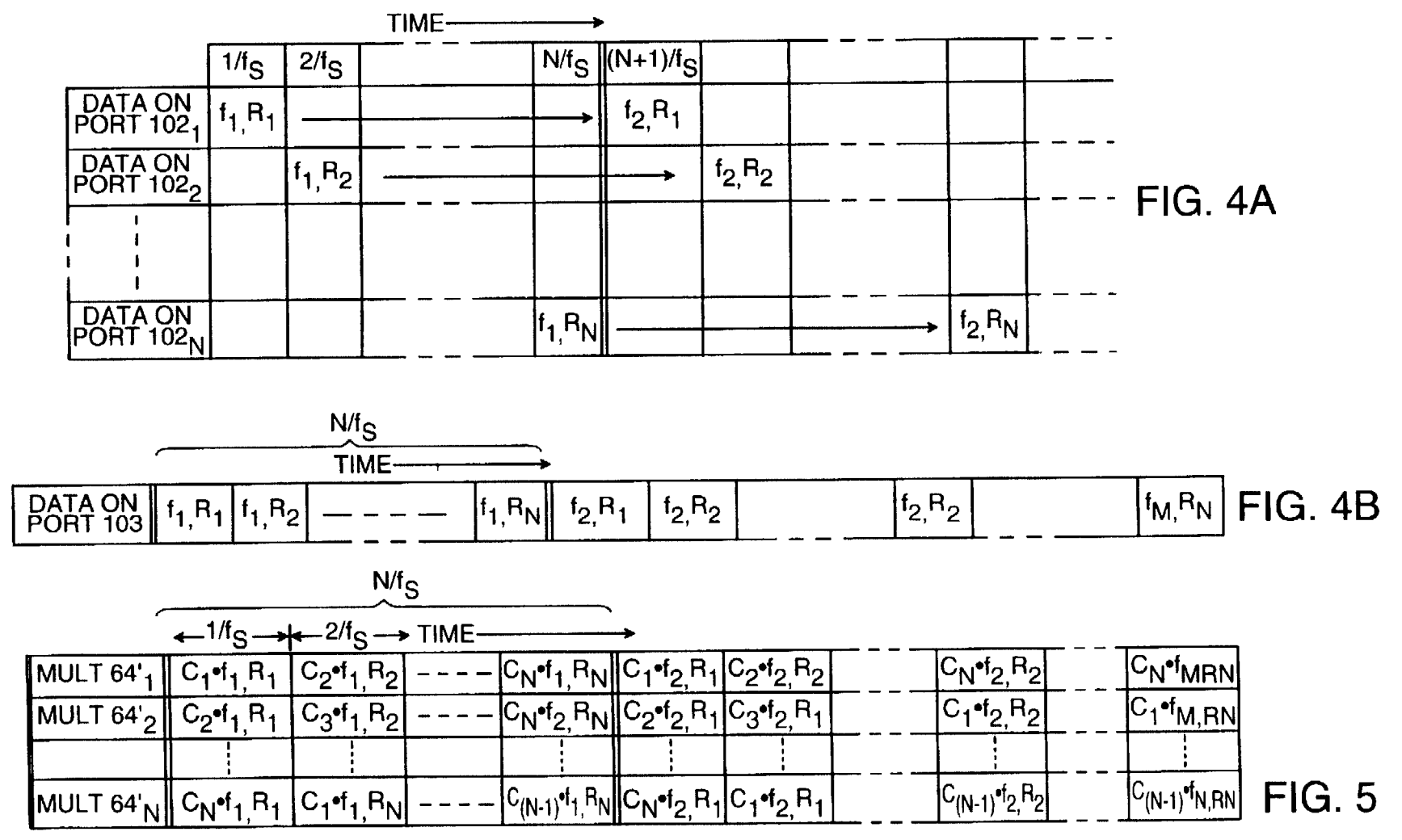

Thus, referring to FIG. 5, it is noted that at time $1/f_s$, a correlation function is performed between the code in stages $C_1$–$C_N$ (corresponding to range $R_1$) and the returns having the frequency component, $f_1$. Likewise, at time $2/f_s$, a correlation function is performed between the code in stages $C_2$–$C_1$ (corresponding to range $R_2$) and the returns having the frequency component, $f_1$. If the target has a Doppler frequency component $f_1$ at range $R_n$, a peak in the auto-correlation function, +N, will appear at the output of the correlator/integrator $62'_n$. The process repeats in like manner so that, over the period of time $N/f_s$, an auto-correlation function has been performed between the frequency component $f_1$ and each of the differently time delayed replica of the code stored in register 16. During the second period of time. $N/f_s$, the process repeats for the frequency component $f_2$. During the Mth period of time, $N/f_s$, the process repeats for the frequency component $f_M$. Thus, if the target has a Doppler frequency, $f_m$, and is at range, $R_n$, a peak in the correlation function +N, appears at the output of correlator/integrator $62'_n$ for the frequency component, $f_m$.

Thus, the output of correlator/integrator $62'_1$ provides for processor 24 an indication the top row, (i.e., the range $R_1$ range channel $67_1$) of the Range-Doppler matrix stored in memory 82 of processor 24. That is, if a +N appears at frequency component $f_m$, the target is at range $R_1$ and has a Doppler frequency $f_m$. Concurrently, multipliers $64'_2$–$64'_N$ and the accumulators and registers fed thereby, operate in like manner, as summarized in FIG. 5 to provide range channels for ranges $R_2$–$R_N$, respectively. Thus, each one of the plurality of, N, correlator/integrators $62'_1$–$62'_N$ produces the frequency spectrum of a radar return at a corresponding range from the transmitter 12.

The processor 24 is fed by the outputs of the plurality of, N, digital correlator/integrators $62'_1$–$62'_N$ for determining the target range and Doppler frequency as described above in connection with FIG. 1.

Figure 6:
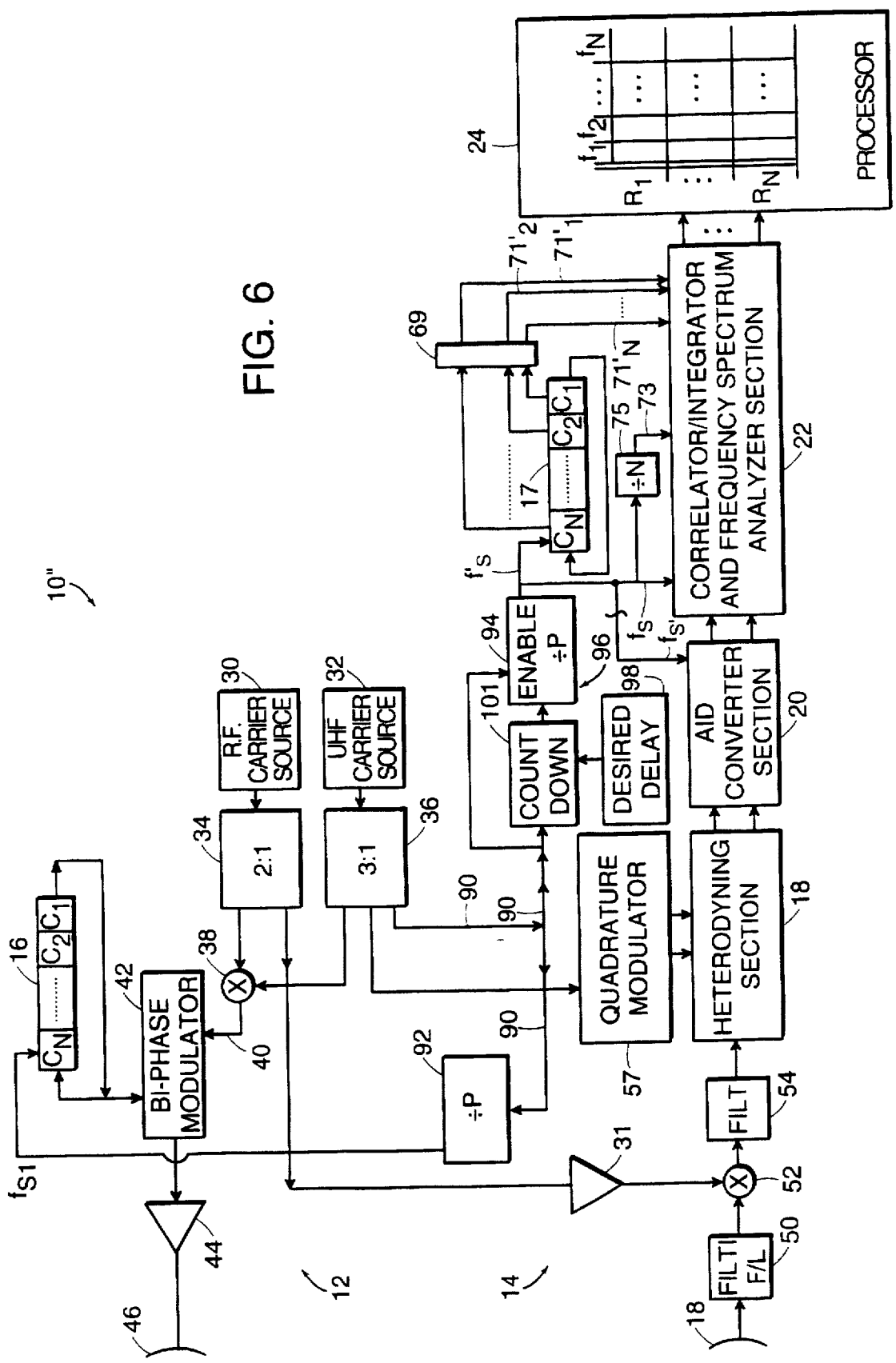
FIG. 6 is a block diagram of the CW radar range measuring system of FIG. 1 or FIG. 2 modified according to another embodiment of the invention to provide increased range resolution.

Before referring to FIG. 6, it is noted that with the system 10 and 10' described above in connection with FIGS. 1 through 5, the range resolution corresponds to a time delay $1/f_s$; i.e., the reciprocal of the bit rate, $f_s$. That is with the system 10 and 10', the bits of the code is transmitted at a bit rate, $f_s$, and therefore the target range is resolved to a range resolution cell of $1/f_s$. Referring now to FIG. 6, the systems 10 and 10' are modified to provide range positioning to resolutions less than $1/f_s$. Thus, the system 10" in FIG. 6 includes, with like elements being again designated with the same numerical designations as those used in FIG. 1 and 3, a transmitter 12 and a receiver 14. The transmitter 12 is adapted to transmit a continuous wave radar signal phase encoded at a rate, $f_s$, in accordance with a code. The code is here a sequentially repeating N-bit binary, pseudo-random noise code stored in a recirculating shift register 16, as shown.

The receiver 14 is adapted to receive a target reflected radar return from the transmitted radar signal and includes: (a) a heterodyning section 18 for translating the radar returns to a baseband frequency; (b) an analog to digital converter section 20 for converting samples of the radar return into a series of corresponding digital words at the rate, $f_s$; (c) a digital correlator/integrator and frequency spectrum analyzer section 22 fed by the series of digital words and the differently time delayed replica of the successively repeating N-bit binary code for producing an output representative of energy in the radar return as function of range from the transmitter 12 for each of a plurality of frequencies; and (d) a processor 24 fed by the output of the digital correlator/integrator and frequency spectrum analyzer section 22 for indicating target range and Doppler frequency.

More particularly, the receiver 14 includes a receive code generator 17 for storing a replica of the transmit code stored in register 16. The receiver code generator 17 produces differently time delayed replica of such transmit code on lines $71'_1$–$71'_N$, respectively. The differently time delayed replica are produced a predetermined time, $\Delta$, after the phased encoded radar signal is transmitted. Further, the transmit code stored in register 16 phase encodes the transmitted continuous wave signal at a predetermined rate, $f_s$. The rate $f_s$ is produced by a source 32, here the UHF carrier source 32. Here the clock pulses are provided by replacing the 2:1 power divider 36 in FIGS. 1 and 3 with a 3:1 power divider 36', as shown. The third output of divider 36' provides, on line 90, clock pulses at a rate $Pf_s$, where P is an integer greater than 1. The clock pulses on line 90 are fed to a divide by P circuit 91. The divide by P circuit 91 therefore produces clock pulse at the bit rate, $f_s$, for the recirculating shift register 16, as indicated. The clock pulses produced by the source 32 are divided in rate by P in a second divide by P circuit 94, as shown, after passing through a time delay circuit 96, as shown. The time delay circuit 96 is fed by a digital word in register 98 representative of a desired time delay, $\Delta$, and by the clock pulses produced by the clock pulse source 32 on line 90, as indicated. The time delay circuit 96 includes a count-down counter 100 which is loaded with a count corresponding to the desired time delay, $\Delta$. The count loaded into the counter 100 may be an integer, S, from zero to (P−1). Thus, the counter 101 changes the logic state at the output thereof after zero through P−1 clock pulses have been fed to it on line 90. The change in logic state at the output of counter 101 enables the second divide by P circuit 94. Thus, the divide by P circuit 94 produces, $f'_s$, at the output thereof the clock pulses on line 90 delayed in time by the desired time delay, $\Delta$, where $\Delta$ is $1/Sf_s$. Thus, the desired time delay, $\Delta$, is less than $S/(Pf_s)$, where S is an integer less than (P−1). The receive code generator 17, in response to the output of the time delay circuit 96, more particularly, the output of the second divide by P circuit 94, $f'_s$ produces the differently time delayed replica of such transmit code on lines $71'_1$–$71'_N$. Further, the analog to digital converter section 20, in response to the clock pulses produced at the output of the time delay circuit 94, more particularly, the output of the second divide by P circuit 94, $f'_s$, converts a sequence of samples of the radar return into a corresponding sequence of digital words at the rate $f_s$. The digital correlator/integrator and spectrum analyzer section is fed by the digital words and the receive codes produced by the receive code generator to provide an indication of radar return energy as a function of range from the transmitter, as described above in connection with FIGS. 1 through 5.

It is noted that where P is greater than 1, the receive codes are delayed with respect to the transmit code by less than $1/f_s$, thereby enabling detection of a target with accuracies less than that corresponding to a time delay of $1/f_s$.

Other embodiments are within the spirit and scope of the appended claims.

What is claimed is:

1. A CW radar range measuring system, comprising:
   (a) a transmitter adapted to transmit a continuous wave radar signal phase encoded in accordance with a pseudo-random code;
   (b) a receiver adapted to receive a radar return from the transmitted radar signal, such receiver, comprising:
      (i) an analog to digital converter section for converting a sequence of samples of the radar return into a corresponding sequence of digital words;
      (ii) a digital correlator/integrator fed by the digital words and differently delayed replica of the pseudo-random code for providing an indication of radar return energy as a function of range from the transmitter; and
      (iii) a processor fed by the digital correlator/integrator for determining, from the indicated energy, target range.

2. The system recited in claim 1 wherein including a frequency spectrum analyzer for determining a frequency spectrum from the digital words and wherein the processor determines the target Doppler frequency from such determined frequency spectrum.

3. The system recited in claim 2 wherein the digital correlator/integrator is fed the digital words and the frequency analyzer is coupled between the digital correlator/integrator and the processor.

4. The system recited in claim 2 wherein the frequency analyzer is fed the digital words and the digital correlator/integrator is coupled between the frequency analyzer and the processor.

5. A CW radar range measuring system, comprising:
   (a) a transmitter adapted to transmit a continuous wave radar signal phase encoded at a rate, fs, in accordance with a successively repeating N-bit binary code, each one of the N bits corresponding to a range;
   (b) a receiver adapted to receive a radar return from the transmitted radar signal, such radar return having the continuous wave radar phase encoded signal shifted in frequency by target Doppler velocity, such receiver, comprising:
      (i) an analog to digital converter section for converting samples of the radar return into a series of corresponding digital words at the rate, fs;
      (ii) a digital correlator/integrator and frequency spectrum analyzer section fed by the series of digital words and differently time delayed replica of the successively repeating N-bit binary code for producing an output representative of energy in the radar return as function of range for each of a plurality of frequencies; and (iii) a processor fed by the output of the digital correlator/integrator and frequency spectrum analyzer section for indicating target range and Doppler frequency.

6. The system recited in claim 5 wherein the transmitter is adapted to transmit the N-bit binary code as a pseudo-random code.

7. A CW radar range measuring system, comprising:

(a) a transmitter adapted to transmit a continuous wave radar signal phase encoded at a rate, fs, in accordance with a successively repeating N-bit binary code;

(b) a receiver adapted to receive a radar return from the transmitted radar signal, such radar return having the continuous wave radar phase encoded signal shifted in frequency by any Doppler velocity of the target, such receiver, comprising:

(i) a heterodyning section for translating the radar return to a baseband frequency;

(ii) an analog to digital converter section for converting samples of the baseband frequency signals into a series of corresponding digital words at the rate, fs;

(iii) a digital correlator/integrator and frequency spectrum analyzer section fed by the series of digital words and differently time delayed replica of the successively repeating N-bit binary code for producing an output representative of energy in the radar return as function of range for each of a plurality of frequencies; and (vi) a processor fed by the output of the digital correlator/integrator for indicating target range and Doppler frequency.

8. The system recited in claim 7 wherein the transmitter is adapted to transmit the N-bit binary code as a pseudo-random code.

9. CW radar range measuring system, comprising:

(a) a transmitter adapted to transmit a continuous wave radar signal phase encoded in accordance with a sequentially repeating N-bit binary code;

(b) a receiver adapted to receive a radar return from the transmitted radar signal, such receiver, comprising:

(i) a heterodyning section for translating the radar returns to a baseband frequency;

(ii) an analog to digital converter section for converting samples of the baseband frequency signals into corresponding digital words;

(iii) a plurality of correlator/integrators, each one being fed by the digital samples produced by the analog to digital converter section and a different time delayed replica of the N-bit binary code, each time delay corresponding to a different range from the transmitter to provide a plurality of range channels, each range channels producing an output representative of the amount of energy in the radar returns having encoded with the transmitted code;

(iv) a frequency spectrum analyzer section comprising a plurality of frequency spectrum analyzers, each one being fed by a corresponding one of the correlator/integrator for determining the frequency spectrum of the radar return in a corresponding one of the plurality of channels; and (v) a processor fed by the frequency spectrum analyzers for determining, from the determined frequency spectra, target range and Doppler frequency.

10. The system recited in claim 9 wherein the transmitter is adapted to transmit the N-bit binary code as a pseudo-random code.

11. A CW radar range measuring system, comprising:

(a) a transmitter adapted to transmit a continuous wave radar signal phase encoded at a rate, $f_s$, in accordance with a successively repeating N-bit binary code;

(b) a receiver adapted to receive radar return from the transmitted radar signal, such receiver, comprising:

(i) a heterodyning section for translating the radar returns to a baseband frequency;

(ii) an analog to digital converter section for converting samples of the baseband frequency signals into a series of corresponding digital words at the rate, $f_s$;

(iii) a time multiplexor fed by the series of digital words for, during each of a series of periods, $T=N/f_s$, coupling each nth one of N sequentially converted samples to a corresponding nth one of N channels at the rate, 1/T;

(iv) a frequency spectrum analyzer section comprising a plurality of, N, frequency spectrum analyzers, each one the analyzers being fed by the digital words coupled to a corresponding one of the N channels, for determining the frequency spectrum of the signal represented by the digital words fed thereto;

(v) a second time multiplexor for, during each of the series of periods, $T=N/f_s$, coupling each nth one of N frequency spectrum analyzers to an output at the rate, 1/T;

(vi) a plurality of, N, correlator/integrator, each one being fed by the second multiplexor output and a different time delayed replica of the N-bit binary code, each time delay corresponding to a different range from the transmitter, each one of the plurality of, N, correlator/integrator producing the frequency spectrum of a radar return at a corresponding range from the transmitter; and (vi) a processor fed by the outputs of the plurality of, N, digital correlator/integrator for determining the target range and Doppler frequency.

12. The system recited in claim 11 wherein the transmitter is adapted to transmit the N-bit binary code as a pseudo-random code.

13. A CW radar range measuring system, comprising:

(a) a transmitter adapted to transmit a continuous wave radar signal phase encoded at a rate, fs, in accordance with a successively repeating N-bit binary code;

(b) a receiver adapted to receive a radar return from the transmitted radar signal, such radar return having the continuous wave radar phase encoded signal shifted in frequency by any Doppler velocity of the target, such receiver, comprising:

(i) a heterodyning section for translating the radar return to a baseband frequency;

(ii) an analog to digital converter section for converting samples of the baseband frequency signals into a series of corresponding digital words at the rate, fs;

(iii) a digital correlator/integrator and frequency spectrum analyzer section fed by the series of digital words and differently time delayed replica of the successively repeating N-bit binary code for producing an output representative of energy in the radar return as function of range for each of a plurality of frequencies; and (vi) a processor fed by the output of the digital correlator/integrator for indicating target range and Doppler frequency.

14. The system recited in claim 13 wherein the transmitter is adapted to transmit the N-bit binary code as a pseudo-random code.

* * * * *